(12) United States Patent
Arrieta et al.

(10) Patent No.: US 8,172,520 B2
(45) Date of Patent: May 8, 2012

(54) TURBINE VANE OF A GAS TURBINE

(75) Inventors: Hernan Victor Arrieta, Munich (DE); Rolf Kleinstueck, Germering (DE); Paul Storm, Freising (DE); Peter Wiedemann, Scheuring (DE)

(73) Assignee: MTU Aero Engines GmbH, Munich (DE)

( * ) Notice: Subject to any disclaimer, the term of this patent is extended or adjusted under 35 U.S.C. 154(b) by 364 days.

(21) Appl. No.: 12/445,439

(22) PCT Filed: Oct. 6, 2007

(86) PCT No.: PCT/DE2007/001788
§ 371 (c)(1),
(2), (4) Date: Apr. 13, 2009

(87) PCT Pub. No.: WO2008/043340
PCT Pub. Date: Apr. 17, 2008

(65) Prior Publication Data
US 2010/0014962 A1 Jan. 21, 2010

(30) Foreign Application Priority Data
Oct. 14, 2006 (DE) .......... 10 2006 048 685

(51) Int. Cl.
*F01D 25/08* (2006.01)
*F04D 29/58* (2006.01)

(52) U.S. Cl. ....... 415/177; 415/200; 416/95; 416/241 R; 416/241 B

(58) Field of Classification Search .............. 416/95, 416/241 R, 241 B; 415/177
See application file for complete search history.

(56) References Cited

U.S. PATENT DOCUMENTS

| 4,121,894 | A | | 10/1978 | Cretella et al. |
| 4,492,522 | A | * | 1/1985 | Rossmann et al. ........ 416/241 R |
| 6,077,036 | A | | 6/2000 | Heffron et al. |

FOREIGN PATENT DOCUMENTS

| EP | 1 013 883 A2 | | 6/2000 |
| EP | 1 544 414 A1 | * | 6/2005 |
| WO | WO 98/10174 | | 3/1998 |

* cited by examiner

*Primary Examiner* — Matthew Landau
*Assistant Examiner* — Vicki B Booker
(74) *Attorney, Agent, or Firm* — Crowell & Moring LLP

(57) ABSTRACT

A turbine vane of a gas turbine, especially a gas turbine aircraft engine, is disclosed. The turbine vane includes a vane base body with an outer surface forming a suction side and a pressure side, the outer surface of the vane base body being at least partially coated with a thermal barrier coating. The thermal barrier coating extends continuously or uninterruptedly at least largely over the suction side and largely over the pressure side of the surface of the vane base body, with the layer thickness of the thermal barrier coating being variable or adjustable.

13 Claims, 1 Drawing Sheet

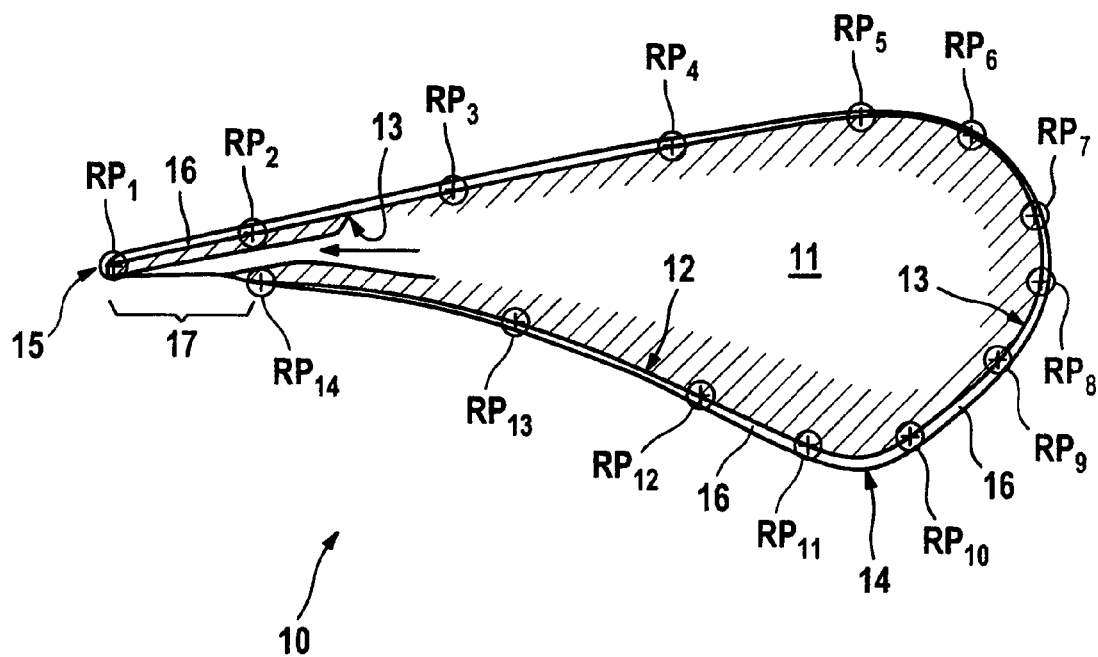

TURBINE VANE OF A GAS TURBINE

BACKGROUND AND SUMMARY OF THE INVENTION

This application claims the priority of International Application No. PCT/DE2007/001788, filed Oct. 6, 2007, and German Patent Document No. 10 2006 048 685.4, filed Oct. 14, 2006, the disclosures of which are expressly incorporated by reference herein.

The invention relates to a turbine vane of a gas turbine, in particular of a gas turbine aircraft engine.

Turbine vanes of a gas turbine, such as, for example, a gas turbine aircraft engine, are exposed to high temperatures and aggressive media during operation so that the turbine vanes are coated to protect surfaces with thermal barrier coatings among other things. For this purpose, known turbine vanes are coated in practice on an outer surface of their vane base body, which forms a suction side and a pressure side of the turbine vane, with a thermal barrier coating having a constant layer thickness. Turbine vanes known from practice are consequently provided with thermal barrier coatings on the outer surface of a vane base body, which have a constant and therefore uniform layer thickness.

It is proposed in U.S. Pat. No. 6,077,036 that a turbine vane, namely a stationary guide vane of a turbine, be coated only partially on regions with a thermal barrier coating, wherein, according to U.S. Pat. No. 6,077,036, the thermal barrier coating extends over a section of the suction side of the turbine vane and wherein the remaining section of the suction side as well as the pressure side of the turbine vane bear no thermal barrier coating whatsoever. The disadvantage of this is that the turbine vanes can be quickly damaged on interfaces between the sections that are coated and not coated with thermal barrier coating.

Starting herefrom, the present invention is based on the object of creating a novel turbine vane of a gas turbine.

According to the invention, the thermal barrier coating extends continuously or uninterruptedly at least largely over the suction side and largely over the pressure side of the surface of the vane base body, with the layer thickness of the thermal barrier coating being variable or adjustable.

In terms of the present invention, a turbine vane is provided, whose thermal barrier coating extends uninterruptedly at least largely over the suction side and largely over the pressure side of the surface of the vane base body, with the layer thickness of the thermal barrier coating being variable. The layer thickness of the thermal barrier coating can be adapted so exactly to the varying thermal stress of the surface regions of the turbine vane, and namely without the risk of damage to the interfaces between the coated and uncoated sections of the surface. This makes is possible to increase the service life of the turbine vanes.

The vane base body is preferably adapted in terms of its surface contour in the region of the suction side and pressure side to the variable or adjustable layer thickness of the thermal barrier coating such that the vane base body compensates for the variable or adjustable layer thickness of the thermal barrier coating so that the combination of the vane base body and the thermal barrier coating provides the desired aerodynamic profile of the turbine vane.

BRIEF DESCRIPTION OF THE DRAWINGS

Preferred further developments of the invention are disclosed in the following description. Without being limited hereto, exemplary embodiments of the invention are explained in greater detail on the basis of the drawing. The drawing shows:

FIG. 1 is a cross section through an inventive turbine vane.

DETAILED DESCRIPTION OF THE DRAWINGS

In the following, the present invention will be described using the example of a turbine vane 10, which is embodied as a stator-side guide vane. However, the invention is not limited to stator-side guide vanes, in fact the invention may also be used on rotor-side rotating vanes of a turbine.

FIG. 1 shows a schematic cross section through a turbine vane 10 embodied as a guide vane, wherein the turbine vane 10 comprises a vane base body 11, with an outer surface forming a pressure side 12, on the one hand, and a suction side 13, on the other. The pressure side 12 and the suction side 13 abut one another, on the one hand, in the region of a flow inlet edge 14 and, on the other hand, in the region of a flow outlet edge 15.

The vane base body 11 of the turbine vane 10 is coated with a thermal barrier coating 16 on its outer surface, and namely such that the thermal barrier coating 16 extends continuously or uninterruptedly at least largely over the region of the suction side 13 and largely over the region of pressure side 12 of the vane base body 11, with the layer thickness being variable or adjustable.

In this case, the vane base body 11 is adapted in terms of its surface contour in the region of the suction side 13 and pressure side 12 to the variable or adjustable layer thickness of the thermal barrier coating 16 such that the vane base body 11 compensates for the variable or adjustable layer thickness of the thermal barrier coating 16. The desired aerodynamic profile of the turbine vane 10 is consequently made available by the interplay of the surface contour of the vane base body 11 and the thermal barrier coating 16 having a variable layer thickness. Thus, the desired aerodynamic profile of the turbine vane 10 is not generated until the thermal barrier coating 16 is applied.

In the exemplary embodiment in FIG. 1, in which the turbine vane 10 is embodied as a stationary guide vane, the thermal barrier coating 16 has the greatest layer thickness adjacent to the flow inlet edge 14. Starting from the flow inlet edge 14, the layer thickness of the thermal barrier coating 16 on the pressure side 12 decreases continuously in the direction of a flow outlet edge 15, wherein no thermal barrier coating is preferably applied to the pressure side 12 directly adjacent to the flow outlet edge 15 so that in a section 17 of the pressure side 12, which as a rule is provided with cooling air exits, the layer thickness of the thermal barrier coating 16 is approximately zero.

Starting from the flow inlet edge 14, the layer thickness of the thermal barrier coating 16 on the suction side 13 decreases continuously initially up to a narrow point of the flow channel and then increases continuously again so that, in the depicted exemplary embodiment, the entire suction side 13 of the turbine vane 10 is coated with a thermal barrier coating 16. Consequently, in the depicted exemplary embodiment, the complete outer surface of the vane base body 11 of the turbine vane 10 except for the section 17 of the pressure side 12 is coated with the thermal barrier coating 16, i.e., continuously between the suction side 13 and pressure side 12 with a variable layer thickness.

A plurality of reference positions $RP_1$ to $RP_{14}$ are plotted in FIG. 1 on the suction side 13 and the pressure side 12, for which the following table indicates the preferred layer thickness D of the thermal barrier coating 16 in μm.

| RP | RP$_1$ | RP$_2$ | RP$_3$ | RP$_4$ | RP$_5$ | RP$_6$ | RP$_7$ | RP$_8$ | RP$_9$ | RP$_{10}$ | RP$_{11}$ | RP$_{12}$ | RP$_{13}$ | RP$_{14}$ |
|---|---|---|---|---|---|---|---|---|---|---|---|---|---|---|
| D | 80 | 80 | 60 | 30 | 10 | 10 | 30 | 90 | 170 | 180 | 170 | 150 | 80 | <1 |

As already mentioned, the invention may also be used on rotating vanes of a turbine.

The invention claimed is:

1. A turbine vane of a gas turbine, comprising:
a vane base body with an outer surface forming a suction side and a pressure side, wherein the outer surface of the vane base body is at least partially coated with a thermal barrier coating;
wherein the thermal barrier coating extends continuously at least mostly over the suction side and at least mostly over the pressure side of the outer surface of the vane base body and wherein a layer thickness of the thermal barrier coating varies;
and wherein the thermal barrier coating has a greatest thickness adjacent to a flow inlet edge of the turbine vane, and wherein starting from the flow inlet edge, the layer thickness of the thermal barrier coating on both the pressure side and the suction side decreases in a direction of a flow outlet edge of the turbine vane.

2. The turbine vane according to claim 1, wherein the turbine vane is a turbine vane of a gas turbine aircraft engine.

3. The turbine vane according to claim 1, wherein the vane base body is adapted in terms of a surface contour in a region of the suction side and the pressure side to the varying layer thickness of the thermal barrier coating such that the vane base body compensates for the varying layer thickness of the thermal barrier coating so that a combination of the vane base body and the thermal barrier coating provides a desired aerodynamic profile of the turbine vane.

4. The turbine vane according to claim 1, wherein the turbine vane is a guide vane.

5. The turbine vane according to claim 1, wherein the layer thickness of the thermal barrier coating on the pressure side decreases continuously starting from the flow inlet edge in the direction of the flow outlet edge.

6. The turbine vane according to claim 5, wherein the layer thickness of the thermal barrier coating on the pressure side is approximately zero in a section adjacent to the flow outlet edge.

7. The turbine vane according to claim 1, wherein the layer thickness of the thermal barrier coating on the suction side decreases continuously initially starting from the flow inlet edge in the direction of the flow outlet edge and then increases continuously again.

8. The turbine vane according to claim 1, wherein the turbine vane is a rotating vane.

9. A method for forming a turbine vane of a gas turbine engine, comprising the steps of:
forming a vane base body with an outer surface, wherein the outer surface defines a suction side and a pressure side of the vane base body;
coating the suction side and the pressure side of the vane base body at least partially with a thermal barrier coating, wherein the thermal barrier coating extends continuously between the suction side and the pressure side; and
varying a layer thickness of the thermal barrier coating on the suction side and the pressure side;
wherein the thermal barrier coating has a greatest thickness adjacent to a flow inlet edge of the turbine vane, and wherein starting from the flow inlet edge, the layer thickness of the thermal barrier coating on both the pressure side and the suction side decreases in a direction of a flow outlet edge of the turbine vane.

10. The method according to claim 9, further comprising the step of:
adapting the vane base body in terms of a surface contour in a region of the suction side and the pressure side to the varying layer thickness of the thermal barrier coating such that the vane base body compensates for the varying layer thickness of the thermal barrier coating so that a combination of the vane base body and the thermal barrier coating provides a desired aerodynamic profile of the turbine vane.

11. The method according to claim 9, wherein the layer thickness of the thermal barrier coating on the pressure side decreases continuously starting from the flow inlet edge in the direction of the flow outlet edge.

12. The method according to claim 11, wherein the layer thickness of the thermal barrier coating on the pressure side is approximately zero in a section adjacent to the flow outlet edge.

13. The method according to claim 9, wherein the layer thickness of the thermal barrier coating on the suction side decreases continuously initially starting from the flow inlet edge in the direction of the flow outlet edge and then increases continuously again.

* * * * *